(12) United States Patent
Palermo et al.

(10) Patent No.: US 6,931,074 B1
(45) Date of Patent: Aug. 16, 2005

(54) TRANSMITTER HAVING PROGRAMMABLE TRANSMISSION PARAMETERS TEMPORALLY ALIGNED WITH PAYLOAD AND METHOD THEREFOR

(75) Inventors: Keith C. Palermo, Higley, AZ (US); Mike F. Durkin, Cave Creek, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 802 days.

(21) Appl. No.: 09/649,559

(22) Filed: Aug. 28, 2000

(51) Int. Cl.[7] ............................................. H04L 27/00
(52) U.S. Cl. ..................................... 375/259; 375/295
(58) Field of Search ............................... 375/219–223, 375/295–315, 257, 267, 259; 370/445

(56) References Cited

U.S. PATENT DOCUMENTS

| | | | |
|---|---|---|---|
| 3,801,956 A | | 4/1974 | Braun et al. .............. 340/146.2 |
| 5,339,307 A | * | 8/1994 | Curtis ......................... 370/445 |
| 5,426,668 A | * | 6/1995 | Lechleider .................. 375/267 |
| 5,898,905 A | | 4/1999 | Aldridge et al. ........... 455/67.4 |
| 6,304,594 B1 | * | 10/2001 | Salinger ...................... 375/222 |
| 6,553,076 B1 | * | 4/2003 | Huang ......................... 375/257 |

* cited by examiner

Primary Examiner—Stephen Chin
Assistant Examiner—Curtis Odom
(74) Attorney, Agent, or Firm—Lowell W. Gresham; Jordan M. Meschkow; Meschkow & Gresham, P.L.C.

(57) ABSTRACT

A software-defined radio (12) includes a transmitter (20) having any number of upstream modules (30) and any number of downstream modules (34). The upstream modules (30) perform signal processing on input signals (28), and the downstream modules (34) provide an RF interface for processed signals (58). The upstream modules (30) and downstream modules (34) couple to a common intra-transmitter signal transporter (32), which may be implemented as a bus. Programmable transmission parameters (60) which program the downstream modules (34) to generate a communication signal (18) exhibiting desired attributes such as frequency and keying are mingled with the processed input signal (58) in upstream modules (30) to preserve timing. The programmable transmission parameters (60) are extracted in downstream modules (34), and applied to the communication signal (18) at the timing specified by position relative to the processed input signal (58).

20 Claims, 3 Drawing Sheets

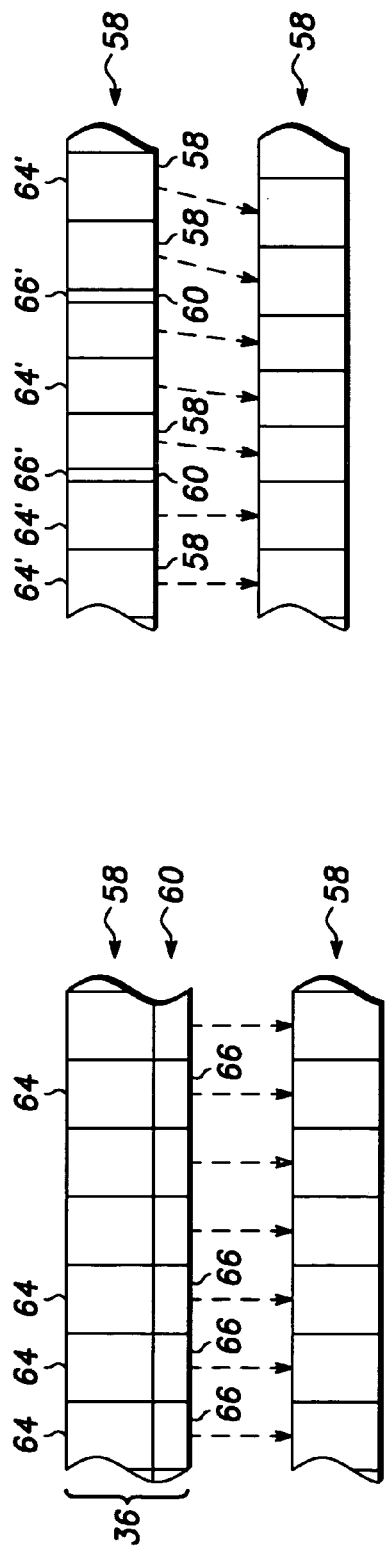
FIG. 4
FIG. 5
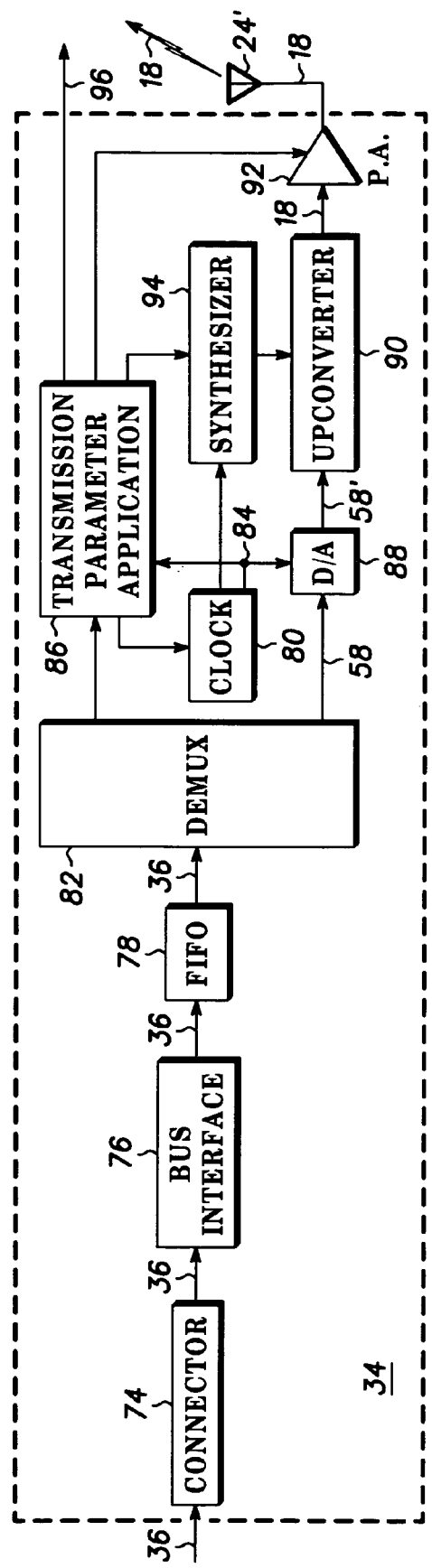
FIG. 6

TRANSMITTER HAVING PROGRAMMABLE TRANSMISSION PARAMETERS TEMPORALLY ALIGNED WITH PAYLOAD AND METHOD THEREFOR

TECHNICAL FIELD OF THE INVENTION

The present invention relates generally to the field of electronic communications. More specifically, the present invention relates to a transmitter in which transmission parameters are mingled with a payload signal to insure that the payload signal is converted into a communication signal configured in accordance with the transmission parameters at the proper time.

BACKGROUND OF THE INVENTION

In order for communications to be successful, a receiver should be mated to a transmitter. In other words, both transmitter and receiver should be compatible with a common communication protocol. A communication protocol sets forth the rules governing the electrical, optical, magnetic, timing, coding, and other conventions used for transmitted and received signals. Over the years, a vast number of communication protocols have been developed, and new communication protocols are being developed routinely. Traditionally, communication hardware was designed to accommodate a specific communication protocol or small range of communication protocols. Accordingly, unless special precautions were taken to insure that two communication devices, such as radios, shared a common communication protocol, they may very well have been unable to communicate.

A software-defined radio may be able to use one set of hardware to engage in communications in accordance with a large number of different communication protocols. Each communication protocol is implemented as a result of computer programming which instructs the one set of hardware how to implement the communication protocol. If a different communication protocol is desired, then a new computer program or at least different parameters may be loaded, and the same set of hardware can successfully communicate in accordance with the different communication protocol.

A goal of a software-defined radio design is to make the software which defines the communication protocols as independent of the hardware as possible. Greater independence is achieved when the software needs to account for fewer hardware constraints and needs to directly control fewer aspects of the hardware. With greater software independence comes greater portability of the software to new, updated, and different hardware platforms provided by different manufacturers. In addition, the more independent the software is from the hardware, the easier and faster the software is to develop and test.

Timing is an aspect of communication protocols where software has been particularly dependent upon hardware. In various communication protocols, including time division multiple access (TDMA), frequency hopping, and others, timing is a significant attribute. For timing to be precise, as required for such communication protocols, the software which implements such communication protocols has conventionally been required to directly control the specific hardware on which it is running. Consequently, such software has been difficult and costly to port to other platforms. Such software has also been intolerant of changes in the hardware or in the software directed to non-timing related functions of the protocol, and has been difficult and costly to develop and test.

In a software-defined communication device having an ability to engage in several communication sessions simultaneously, with different sessions using different communication protocols, the direct interface to the communication media, e.g., the air interface for a radio frequency (RF) communication device, is desirably physically separated from and controlled independently from the other signal processing that couples to this direct interface. This architecture permits greater flexibility in applying resources to particular communication session needs and leads to greater reliability. Unfortunately, the benefits this architecture provides are countered by an exacerbated software-controlled timing problem.

Accordingly, what is needed is an architecture that accommodates synchronizing various features of a software-defined communication device while promoting software independence from the hardware.

BRIEF SUMMARY OF THE INVENTION

The above-discussed needed architecture may be accomplished in one form by a transmitter having programmable transmission parameters temporally aligned with a payload signal. The transmitter includes an upstream module for receiving an input signal from a signal source, generating a processed signal from the input signal, and mingling the programmable transmission parameters with the processed signal to form a compound signal. The transmitter also includes an intra-transmitter signal transporter having an input coupled to the upstream module and configured to transport the compound signal to an output of the intra-transmitter signal transporter. Furthermore, the transmitter includes a downstream module having an input coupled to the intra-transmitter signal transporter output, the downstream module being configured to extract the programmable transmission parameters from the compound signal to recover the processed signal and to convert the processed signal into a communication signal configured in accordance with the programmable transmission parameters.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a data format diagram depicting the extraction of programmable transmission parameters from a compound signal in the downstream module in accordance with one preferred embodiment of the present invention;

FIG. 5 shows a data format diagram depicting the extraction of programmable transmission parameters from a compound signal in the downstream module in accordance with another preferred embodiment of the present invention; and FIG. 6 shows an exemplary block diagram of a downstream module of the software-defined radio shown in FIG. 1.

DETAILED DESCRIPTION OF THE DRAWINGS

Figure 1:
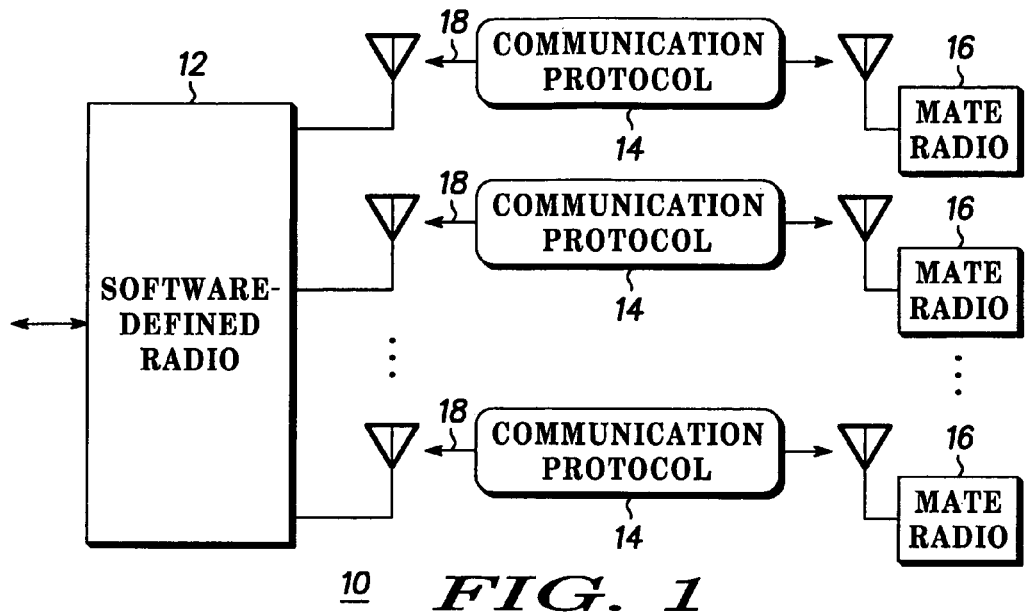
FIG. 1 shows a block diagram of a communication system in which a software-defined radio operates in accordance with one preferred embodiment of the present invention.

FIG. 1 shows a block diagram of a communication system 10 in which a software-defined radio 12 operates in accordance with one preferred embodiment of the present invention. Software-defined radio 12 communicates using any number of communication protocols 14 with any number of mate radios 16. A communication protocol may also be called a communication standard or a waveform. A communication protocol sets forth the rules governing the electrical, optical, magnetic, timing, coding, and other conventions used for transmitting and receiving communication signals 18. Mate radios 16 are compatible with the communication protocols 14 supported by software-defined radio 12. In the preferred embodiment, any number of communication protocols 14 may be simultaneously supported by software-defined radio 12, and software-defined radio 12 may be reprogrammed as needed so that different communication protocols 14 are supported at different times.

FIG. 1 depicts communication protocols 14 as applying to communication signals 18 which are bidirectional. However, bidirectional communication signals are not a requirement. The below-presented discussion focuses on a forward link communication signal 18 transmitted from a transmitter in software-defined radio 12 and received at one or more receivers in mate radios 16. Those skilled in the art will appreciate that the teaching of the below-presented discussion can, but need not, be adapted to a reverse link communication signal 18.

Likewise, in the preferred embodiment depicted in FIG. 1, communication protocols 14 apply to radio frequency (RF) wireless, broadcast communication signals 18. While communication devices which exchange this form of communication signals 18 can well benefit from the teaching of the present invention, nothing prevents the teaching of the present invention from being used in connection with communication signals 18 transmitted over cables, whether as electrical or optical signals.

Figure 2:
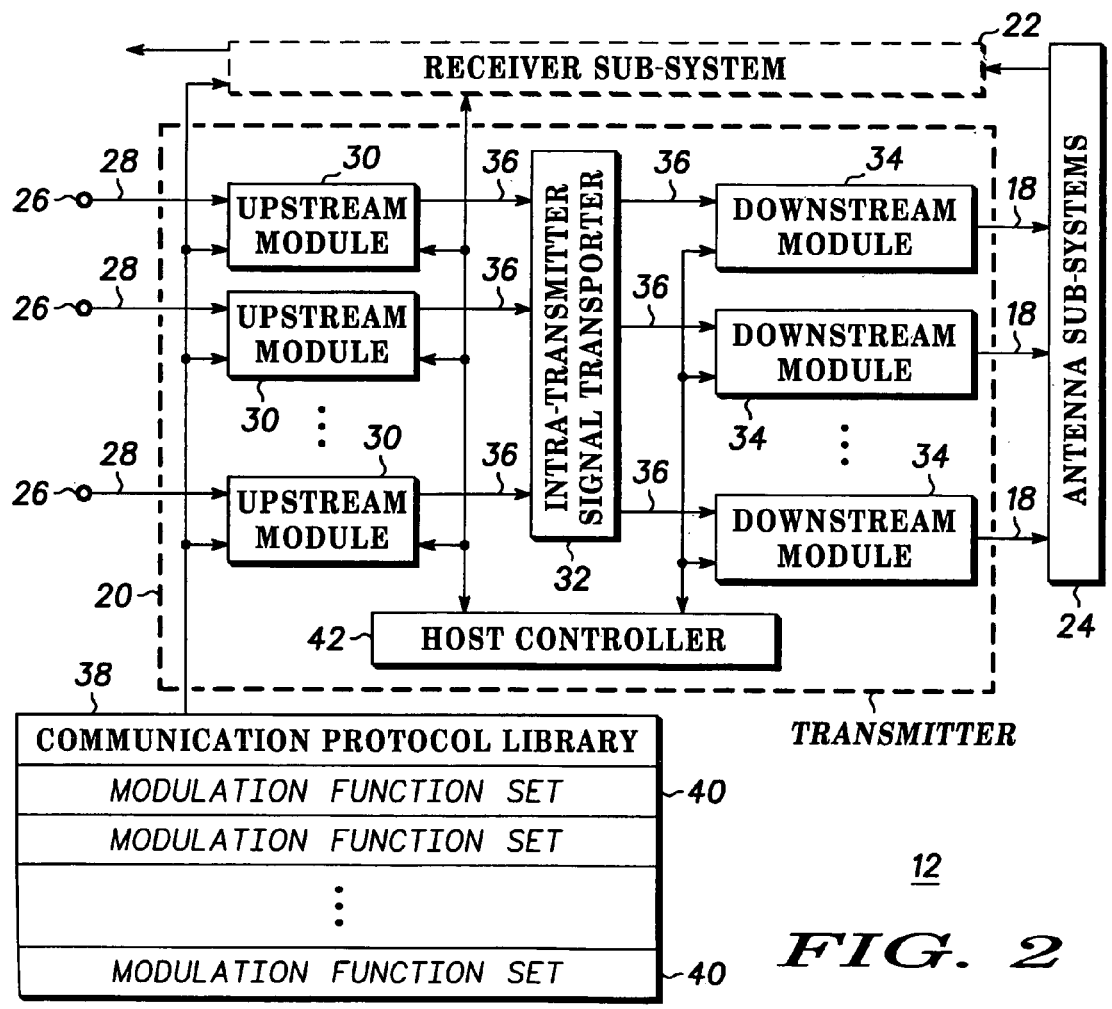
FIG. 2 shows a block diagram of the software-defined radio shown in FIG. 1.

FIG. 2 shows a block diagram of software-defined radio 12. Software-defined radio 12 includes a transmitter 20 and an optional receiver subsystem 22, shown in phantom. Transmitter 20 and receiver sub-system 22 may, but are not required to, share a common antenna sub-system 24.

Input signal sources 26 provide input signals 28 to any number of software programmable upstream modules 30 of transmitter 20. For compatibility with the depiction of software-defined radio 12 in FIG. 2 and in subsequent figures herein, reference numbers directed to lines which connect to blocks, such as reference numbers 28, are used to indicate the signals which propagate as indicated by the lines. Input signals 28 convey the payload information to be communicated from transmitter 20.

Each upstream module 30 couples to an input of an intra-transmitter signal transporter 32, and outputs of intra-transmitter signal transporter 32 couple to inputs of any number of software programmable downstream modules 34. Upstream and downstream modules 30 and 34 are so named to distinguish them from each other and for compatibility with the transmission direction of signal flow. Those skilled in the art will appreciate that no functional limitation is implied by these names. While upstream modules 30 and downstream modules 34 are discussed in detail below, upstream modules 30 may generally be viewed as generating their own compound signals 36. Intra-transmitter signal transporter 32 transports compound signals 36 to various downstream modules 34, where they are converted into communication signals 18, which are wirelessly broadcast from transmitter 20 at antenna sub-system 24.

Receiver sub-system 22 and each upstream module 30 couple to a communication protocol library 38 which stores computer software defining any number of modulation function sets 40. Each modulation function set 40 desirably defines a substantially complete communication protocol 14 (FIG. 1). The definitions may be in the form of computer programming instructions, variables, lists, tables, and the like. Through a host controller 42, upstream modules 30 are in data communication with downstream modules 34. Accordingly, the definitions of modulation function sets 40 may be provided to both upstream and downstream modules 30 and 34 as necessary.

In the preferred embodiment, intra-transmitter signal transporter 32 is a bus operated in accordance with a predetermined bus protocol, such as PCI, VME and the like. Thus, the benefits of reliability, simplicity, and low cost associated with the use of a bus to transport numerous signals to and from numerous locations are achieved. However, compound signals 36 experience varying delays in being transported between downstream modules 34 and upstream modules 30. The delays result, at least in part, by requiring compound signals 36 to experience difficult-to-predict wait states when the bus is occupied transporting other signals. In an alternate embodiment, intra-transmitter signal transporter 32 is configured as a switch which need not impose varying amounts of delay on compound signals 36 but which may not lead to the benefits of using a bus.

The use of a number of upstream modules 30 and a number of downstream modules 34 promotes flexibility in configuring transmitter 20 and promotes reliability of software-defined radio 12. Nothing requires all upstream modules 30 to have the same hardware configuration or all downstream modules 34 to have the same hardware configuration. Desirably, each upstream module 30 is replaceable independently from the other upstream modules 30 and from each downstream module 34. Each downstream module 34 is desirably replaceable independently from the other downstream modules 34 and from each upstream module 30. Transmitter 20 may be configured so that any upstream module 30 can feed its compound signal 36 to any downstream module 34. If a failure occurs in either an upstream module 30 or a downstream module 34, then the failed module 30 or 34 may be replaced without taking another module 30 or 34 out of service.

Figure 3:
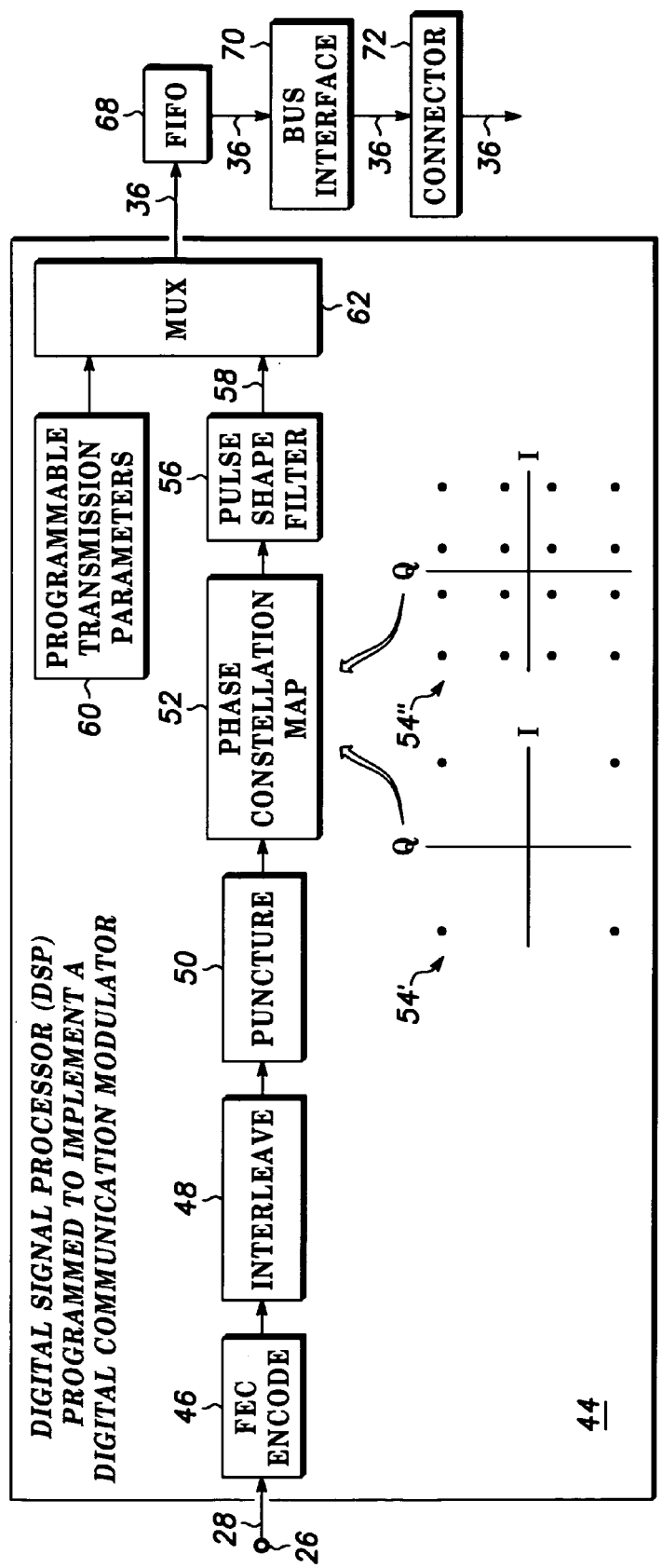
FIG. 3 shows an exemplary block diagram of an upstream module of the software-defined radio shown in FIG. 1.

FIG. 3 shows an exemplary block diagram of upstream module 30. Desirably, each upstream module 30 has a hardware configuration similar to the others. In the exemplary embodiment, upstream module 30 includes a digital signal processor (DSP) or a collection of DSPs which are programmed to implement a digital communication modulator 44. The programming which causes the DSP(s) to implement digital communication modulator 44 is defined by one of modulation function sets 40 (FIG. 2). Digital communication modulator 44 receives input signal 28 in the form of a digital data stream conveying payload information from signal source 26.

Digital communication modulator 44 includes a collection of functions. The collections may differ from one modulation function set 40 (FIG. 2) to another modulation function set 40, and the manner in which each given function may be implemented may differ from function set 40 to function set 40. FIG. 3 depicts a typical collection of functions, but other digital communication modulators 44 may omit some of the depicted functions or include other functions. For example, input signal 28 may be acted upon by a forward error correction (FEC) encode function 46. FEC encode function 46 may implement block, convolutional, turbo, or other encoding schemes known to those skilled in the art in a manner defined by the operative modulation function set 40. Different forms of encoding will impart different amounts of transport delay on the input signal.

The encoded input data stream may then be acted upon by an interleave function 48, which imposes additional delay on the payload information. The amount of delay imposed is often determined in response to the type of encoding applied in FEC encode function 46. The interleaved signal may then be subjected to a puncture function 50, which slightly alters the timing of the payload information to achieve a specified coding rate.

A phase constellation map function 52 phase-maps the input data stream to a complex phase space in accordance with a phase constellation 54 specified by the operative modulation function set 40. FIG. 3 illustrates a QPSK phase constellation 54' and a 16-QAM phase constellation 54", both of which are well understood by those skilled in the art. Typically, one modulation function set 40 would define one phase constellation 54 while another modulation function set 40 would define a second phase constellation 54. Those skilled in the art will appreciate that any number of different phase constellations may be implemented as defined by various modulation function sets 40.

The phase mapped input data stream may then be acted upon by a pulse shape filter function 56, which typically implements a Nyquist, root-Nyquist, raised cosine, or similar type of filter for purposes of spectral containment. Different implementations of phase constellations 54 and pulse shape filter functions 56 specified by different modulation function sets 40 may impose different amounts of transport delay on input data stream 28.

Consequently, a processed signal 58 generated by digital communication modulator 44 at an output of pulse shape filter function 56 may experience a considerable transport delay which will vary widely from modulation function set 40 to modulation function set 40. Moreover, different modulation function sets 40 can be simultaneously implemented in different upstream modules 30, and upstream modules 30 are reprogrammed from time to time to implement different modulation function sets 40. Thus, different digital communication modulators 44 will impart different transport delays to input signals 28.

The operative modulation function set 40 defining a given communication protocol 14 (FIG. 1) may specify other characteristics which are affected by timing. In particular, parameters of the given communication protocol 14 may affect the RF interface and be applied by a downstream module 34 (FIG. 2) of transmitter 20 (FIG. 2). For example, in a TDMA communication protocol 14, a power amplifier may need to be keyed off and on in accordance with strict timing requirements in order to implement the communication protocol 14. In a frequency hopping application, a carrier frequency of communication signal 18 (FIG. 1) may need to be switched to new frequency values in accordance with strict timing requirements in order to implement the communication protocol 14. In other applications, baud rates may change from time-to-time in accordance with a strict schedule, transmit and receive switching may toggle in accordance with a strict schedule, bandwidths of filters may need to change in accordance with a strict schedule, and the like. Such parameters implemented in downstream module 34 are referred to as programmable transmission parameters 60 herein. In the preferred embodiment, digital communication modulator 44 mingles programmable transmission parameters 60 with processed signal 58 to form compound signal 36. Programmable transmission parameters 60 may be mingled with processed signal 58 in a multiplexer (MUX) 62 or other function as best suited to a particular application.

FIG. 4 shows a data format diagram depicting the mingling of programmable transmission parameters 60 with processed signal 58 to form compound signal 36 in accordance with an "in-parallel" embodiment of the present invention. As depicted in FIG. 4, each sample 64 of processed signal 58 is accompanied in-parallel by control bits 66 that convey programmable transmission parameters 60. For example, fourteen bits of each word from a stream of sixteen bit words may convey samples from processed signal 58 while the remaining two bits of the sixteen bit words in the data stream convey control bits 66. In this example, one of the two control bits may indicate when to key an RF power amplifier and another of the two control bits may indicate when to switch to a different carrier frequency.

FIG. 5 shows a data format diagram depicting the mingling of programmable transmission parameters 60 with processed signal 58 to form compound signal 36 in accordance with an "in-series" embodiment of the present invention. As depicted in FIG. 5, sample blocks 64' of processed signal 58 may be interspersed in-series with blocks 66' of control data. Control data blocks 66' may be of any desired length, and that length may vary as needed to convey a needed amount of data. Desirably, control data blocks 66' include data which indicate relative timing for when the control data should take effect. For example, the control data may be configured to take effect immediately following the control data block 66' in which it is evaluated.

Referring back to FIG. 3, compound signal 36 output from mingling function 62 serves as an output from digital communication modulator 44. Compound signal 36 is routed to a first-in, first-out (FIFO) memory buffer 68 which imposes varying amounts of delay on compound signal 36. However, any delay imposed on processed signal 58 is likewise imposed on programmable transmission parameters 60. Thus, programmable transmission parameters 60 remain synchronized with processed signal 58. After experiencing delay in FIFO memory buffer 68, compound signal 36 is routed through a bus interface 70 and connector 72, where it is passed to intra-transmitter signal transporter 32 (FIG. 2).

Connector 72 promotes the independence of upstream modules 30 from downstream modules 34 within transmitter 20 by allowing upstream modules 30 to be independently replaceable from downstream modules 34. Bus interface 70 determines when intra-transmitter signal transporter 32 is available for transporting samples of compound signal 36, and obtains such samples from FIFO memory buffer 68 when appropriate. FIFO memory buffer 68 allows digital communication modulator 44 to operate at a constant clock speed in spite of compound signal 36 samples being transported on intra-transmitter signal transporter 32 at a non-constant rate.

FIG. 6 shows an exemplary block diagram of a downstream module 34 of transmitter 20 (FIG. 2). Compound signal 36 passes from intra-transmitter signal transporter 32 (FIG. 2) through a connector 74, a bus interface 76, and into a FIFO memory buffer 78. Connector 74 promotes independence of upstream modules 30 from downstream modules 34, bus interface 76 provides address decoding and control functions for intra-transmitter signal transporter 32. FIFO memory buffer 78 imparts varying amounts of delay on compound signal 36 to synchronize compound signal 36 to a time base established by a clock circuit 80 for downstream module 34.

A demultiplexer (DEMUX) 82 obtains compound signal 36 from FIFO memory buffer 78 in synchronism with a clock signal 84 generated by clock circuit 80 and extracts programmable transmission parameters 60 from compound signal 36 to recover processed signal 58. The extraction process performed by demultiplexer 82 is illustrated in FIGS. 4 and 5 for the in-parallel and in-series embodiments discussed above. Extracted programmable transmission parameters 60 are supplied to a transmission parameter applicator 86, and recovered processed signal 58 is supplied to a digital-to-analog converter (D/A) 88. Digital-to-analog converter 88 converts the digital form of processed signal 58 into an analog form 58' of processed signal 58 in response to clock signal 84. Specifically, an output of digital-to-analog converter 88 couples to a first input of an upconverter 90. Upconverter 90 converts processed signal 58' into communication signal 18. An output of upconverter 90 couples to an input of an RF power amplifier (P.A.) 92, and an output of RF power amplifier 92 couples to an antenna 24' from antenna sub-system 24 (FIG. 2). Communication signal 18 is wirelessly broadcast from transmitter 20 at antenna 24'.

Transmission parameter applicator 86 has outputs corresponding to the various programmable transmission parameters 60 which are applied in downstream module 34. One output of transmission parameter applicator 86 couples to a control input of a synthesizer 94 to specify the frequency of a signal generated by synthesizer 94. A clock input of synthesizer 94 couples to an output of clock circuit 80, and an output of synthesizer 94 couples to a second input of upconverter 90. Thus, the frequency of the signal generated by synthesizer 94 corresponds to the carrier frequency of the communication signal 18 generated by downstream module 34.

Another output of transmission parameter applicator 86 couples to a control input of RF power amplifier 92. Keying of RF Power amplifier 92 may be provided through this control input. Another output of transmission parameter applicator 86 couples to clock circuit 80 and may be used to establish the clock rate for digital-to-analog converter 88 and a baud rate for the communication signal 18 generated by downstream module 34. As indicated at an output 96 from transmission parameter applicator 86, other programmable transmission parameters may be provided to control filter bandwidths, control transmit/receive timing, and the like.

Accordingly, carrier frequencies, keying, and other attributes of communication signal 18 are configured in accordance with programmable transmission parameters 60. The timing at which programmable transmission parameters 60 are mingled with processed signal 58 in upstream module 30 defines the timing at which such programmable transmission parameters 60 take effect in communication signal 18, produced by downstream module 34.

In summary, the present invention provides an improved transmitter having programmable transmission parameters temporally aligned with payload data and an improved method therefor. Software independence from hardware is accommodated while synchronizing various features of a software-defined communication device. Software independence is accommodated because the variable timing associated with implementing different modulation function sets 40 in upstream modules 30 and the variable timing associated with transporting processed signals 58 over intra-transmitter signal transporter 32 need not be considered and tracked by the software. Programmable transmission parameters are applied synchronously to payload data even though different instances of payload data experience varying amounts of delay caused by any number of factors.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A transmitter having programmable transmission parameters temporally aligned with a payload signal, said transmitter comprising:
   an upstream module for receiving an input signal from a signal source, generating a processed signal from said input signal, and mingling said programmable transmission parameters with said processed signal to form a compound signal;
   an intra-transmitter signal transporter having an input coupled to said upstream module and configured to transport said compound signal to an output of said intra-transmitter signal transporter; and
   a downstream module having an input coupled to said intra-transmitter signal transporter output, said downstream module being configured to extract said programmable transmission parameters from said compound signal to recover said processed signal and to convert said processed signal into a communication signal configured in accordance with said programmable transmission parameters.

2. A transmitter as claimed in claim 1 wherein:
   said upstream module is one of a plurality of upstream modules each of which couples to said intra-transmitter signal transporter;
   said downstream module is one of a plurality of downstream modules each of which couples to said intra-transmitter signal transporter; and
   said compound signal is one of a plurality of compound signals transported by said intra-transmitter signal transporter.

3. A transmitter as claimed in claim 2 wherein said intra-transmitter signal transporter is a bus operated in accordance with a bus protocol that causes said compound signals to be transported thereon after experiencing varying delays.

4. A transmitter as claimed in claim 1 wherein said downstream module generates said communication signal by modulating a carrier signal, said carrier signal exhibiting a frequency specified by said programmable transmission parameters.

5. A transmitter as claimed in claim 1 wherein said downstream module generates said communication signal by modulating a carrier signal which is keyed as specified by said programmable transmission parameters.

6. A transmitter as claimed in claim 1 wherein:
   said input signal is a digital data stream;
   said upstream module is a digital communication modulator which modulates said input signal in accordance with a phase constellation to produce said processed signal in a digital form; and
   said downstream module includes a digital-to-analog converter for converting said processed signal so that said communication signal exhibits an analog form.

7. A transmitter as claimed in claim 6 wherein:
said digital communication modulator applies first modulation functions at a first point in time on said input signal to generate said processed signal, said first modulation functions being defined by a first set of programming;
said digital communication modulator additionally applies second modulation functions at a second point in time on said input signal to generate said processed signal, said second modulation functions being defined by a second set of programming; and
a transport delay imposed by said digital communication modulator in generating said processed signal from said input signal under said first set of programming differs from a transport delay imposed in generating said processed signal from said input signal under said second set of programming.

8. A transmitter as claimed in claim 1 wherein:
said upstream module comprises a connector through which said compound signal passes to said intra-transmitter signal transporter;
said downstream module comprises a connector through which said compound signal passes from said intra-transmitter signal transporter; and
said downstream module is replaceable independently from said upstream module.

9. A transmitter as claimed in claim 1 wherein:
said downstream module converts said processed signal into said communication signal in response to a clock signal; and
said transmitter additionally comprises a first-in-first-out memory buffer configured to synchronize said compound signal to said clock signal.

10. A transmitter as claimed in claim 1 wherein:
said downstream module upconverts said processed signal so that said communication signal is a radio frequency (RF) signal; and
said downstream module comprises an RF power amplifier coupled to an antenna, said RF power amplifier and said antenna being configured to wirelessly broadcast said communication signal.

11. In a communication system in which a transmitter transmits a communication signal to one or more receivers in accordance with one or more communication protocols, a method of forming said communication signal in response to programmable transmitter parameters that are temporally aligned with payload information, said method comprising:
generating a processed signal from an input signal which conveys said payload information;
mingling said programmable transmission parameters with said processed signal to form a compound signal;
transporting said compound signal from an upstream module to a downstream module;
extracting said programmable transmission parameters from said compound signal in said downstream module to recover said processed signal; and
converting said recovered processed signal into said communication signal, said communication signal being configured in accordance with said programmable transmission parameters.

12. A method as claimed in claim 11 wherein said transporting activity causes said compound signal to experience varying amounts of delay.

13. A method as claimed in claim 11 additionally comprising, prior to said extracting activity, delaying said compound signal in a first-in-first-out (FIFO) memory buffer which imposes varying delays on said compound signal.

14. A method as claimed in claim 11 wherein said converting activity comprises modulating a carrier signal, said carrier signal exhibiting a frequency specified by said programmable transmission parameters.

15. A method as claimed in claim 11 wherein said converting activity comprises modulating a carrier signal which is keyed as specified by said programmable transmission parameters.

16. A method as claimed in claim 11 wherein:
said input signal is a digital data stream;
said generating activity is performed by a digital communication modulator which modulates said input signal in accordance with a phase constellation to produce said processed signal in a digital form; and
said converting activity comprises converting said recovered processed signal so that said communication signal exhibits an analog form.

17. A method as claimed in claim 16 wherein:
said digital communication modulator is programmed to apply first modulation functions to said digital data stream and impose a first transport delay on said digital data stream; and
said method additionally comprises reprogramming said digital communication modulator to apply second modulation functions to said digital data stream and impose a second transport delay on said digital data stream, said second transport delay differing from said first transport delay.

18. A transmitter as claimed in claim 11 wherein said converting activity upconverts said recovered processed signal so that said communication signal is a radio frequency (RF) signal which is wirelessly broadcast to said one or more receivers.

19. A radio frequency (RF) transmitter for use in a communication system in which said RF transmitter transmits first and second communication signals to one or more receivers in accordance with one or more communication protocols, said transmitter comprising:
a first software-programmable upstream module programmed to apply first digital communication modulation functions to a first input signal and to generate a first processed signal which exhibits a first transport delay relative to said first input signal, said first upstream module having a first upstream connector and being configured to mingle first programmable transmission parameters with said first processed signal to form a first compound signal which passes through said first upstream connector;
a second software-programmable upstream module programmed to apply second digital communication modulation functions to a second input signal and to generate a second processed signal which exhibits a second transport delay relative to said second input signal, said second upstream module having a second upstream connector and being configured to mingle second programmable transmission parameters with said second processed signal to form a second compound signal which passes through said second upstream connector;
an intra-transmitter signal transporter having a first input coupled to said first connector and a second input coupled to said second connector, said intra-transmitter signal transporter being configured to respectively transport said first and second compound signals to first and second outputs of said intra-transmitter signal transporter, said first and second compound signals being transported with varying amounts of delay;

a first downstream module having a first downstream connector coupled to said first output of said intra-transmitter signal transporter, said first downstream module being configured to extract said first programmable transmission parameters from said first compound signal to recover said first processed signal and to convert said first processed signal into said first communication signal configured in accordance with said first programmable transmission parameters; and a second downstream module having a second downstream connector coupled to said second output of said intra-transmitter signal transporter, said second downstream module being configured to extract said second programmable transmission parameters from said second compound signal to recover said second processed signal and to convert said second processed signal into said second communication signal configured in accordance with said second programmable transmission parameters.

20. An RF transmitter as claimed in claim 19 wherein:

said first downstream module generates said first communication signal by modulating a first carrier signal, said first carrier signal exhibiting a frequency specified by said first programmable transmission parameters and being keyed as specified by said first programmable transmission parameters; and said second downstream module generates said second communication signal by modulating a second carrier signal, said second carrier signal exhibiting a frequency specified by said second programmable transmission parameters and being keyed as specified by said second programmable transmission parameters.

* * * * *